June 4, 1968 J. G. SPANBAUER 3,387,223
HIGH GAIN MAGNETIC AMPLIFIER
Filed Aug. 27, 1965
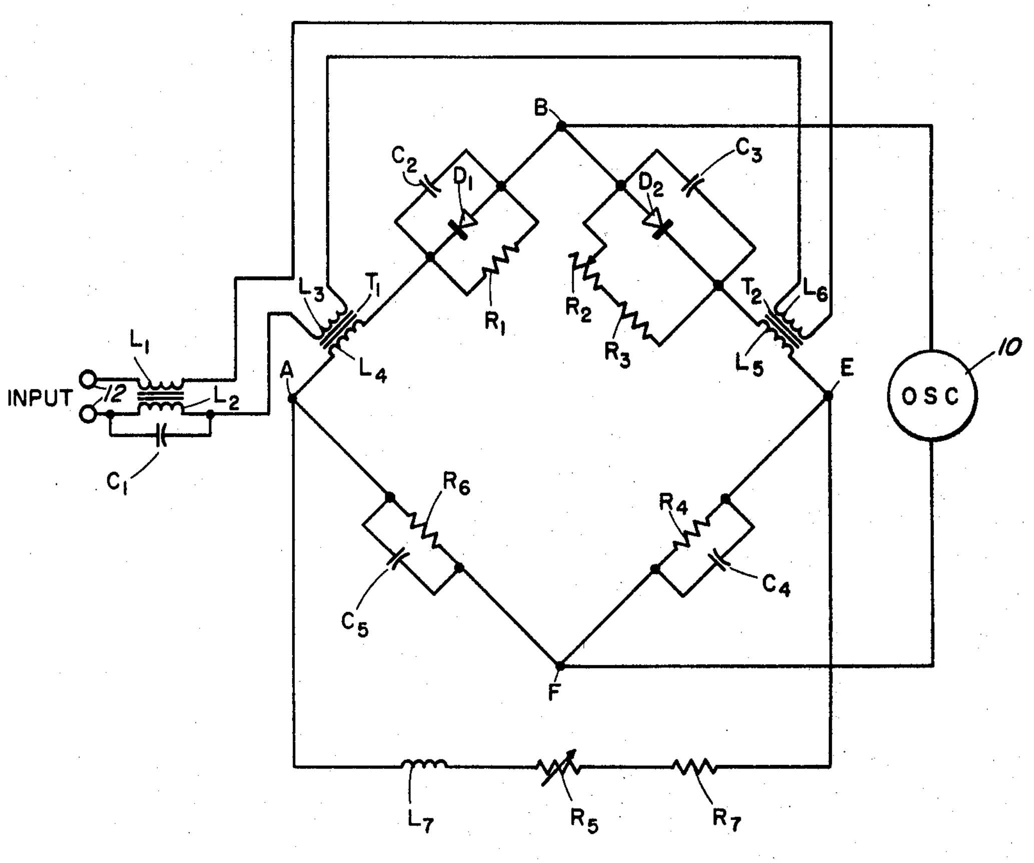
INVENTOR.
John G. Spanbauer
BY
ATTORNEY.
AGENT.

United States Patent Office 3,387,223

Patented June 4, 1968

3,387,223
HIGH GAIN MAGNETIC AMPLIFIER

John G. Spanbauer, Silver Spring, Md., assignor to the United States of America as represented by the Secretary of the Navy Filed Aug. 27, 1965, Ser. No. 483,377
7 Claims. (Cl. 330—8)

The invention described herein may be manufactured and used by or for the Government of the United States of America for governmental purposes without the payment of any royalties thereon or therefor.

This invention is a magnetic bridge amplifier and more particularly a magnetic bridge amplifier which amplifies low frequency signals from a low impedance source to provide high current gain.

Well known magnetic amplifiers of the type contemplated have generally provided relatively high current gains by taking advantage of various bridge circuit configurations and incorporating positive feedback therewith. One such amplifier disclosed in Patent number 3,052,827 granted to Olsen et al. on Sept. 4, 1962, utilizes a magnetic firing mechanism for a mine. The magnetic bridge amplifier disclosed therein has a pair of saturable reactor cores each having a control winding and a load winding with a feedback connection between the load and control winding and is capable of amplifyig input currents, in the range of .0005 microamp to 0.5 microamp in the frequency range of 0.1 c.p.s. to .125 c.p.s., approximately 120 times.

While such devices have been useful in obtaining gains of the order mentioned above, they have been unsatisfactory for producing substantially higher gains since the feedback circuitry is limited to a level below which undesirable switching transients will not occur. The general purpose of this invention is to provide a magnetic bridge amplifier which embraces all the advantages of similarly employed magnetic amplifiers and possesses none of the aforedescribed disadvantages. To attain this, the present invention contemplates a magnetic bridge amplifier which does not have positive feedback but which is capable of producing current gains up to 900 and above with low frequency, low amplitude input signals.

An object, therefore, is the provision of a magnetic bridge amplifier which produces high current gains from low frequency, low amplitude input signals.

Another object is to provide a magnetic bridge amplifier which produces high current gain without the use of a feedback connection.

Still another object is to provide a magnetic bridge amplifier having a magnetic core with an input winding and load winding and a series connected diode in two of the bridge arms, which does not have a feedback connection between the input and load windings, and which has high current stability and high current gain.

Other objects and many of the attendant advantages of this invention will be readily appreciated as the same becomes better understood by reference to the following detailed description when considered in connection with the accompanying drawing in which like reference numerals designate like parts throughout the figure thereof and wherein the figure illustrates the circuit diagram of the magnetic bridge amplifier.

Referring now to the figure, an oscillator 10 is connected to junctions B and F of the magnetic bridge amplifier; and a load consisting of inductor L7, resistor R7, and variable resistor R5 is connected between junctions A and F. Two matched saturable reactors $T_1$ and $T_2$ consisting of a saturable core with load and control windings are connected in bridge arm A–B and B–E, respectively. Reactor T1 has a control winding L3 and load winding L4 while reactor T2 has a control winding L6 and a load winding L5.

A tuned laminated isolating choke is connected between input terminals 12 and the control winding L3 in series with winding L6. The tuned choke has windings L1 and L2 wound about a high permeable core and a capacitor C1 connected in shunt with winding L2.

Rectifiers D1 and D2 are connected in series with load windings L4 and L5 respectively, and are shunted by resistors R1, and R2 in series with resistor R3 respectively. Rectifiers D1 and D2 are also shunted by capacitor C2 and capacitor C3 respectively. Resistor R3 has a resistance value less than, but approaching, the value of resistor R1; for example, resistor R1 may have a value of 500 kilohms and a resistor R3 may be on the order of 400 kilohms. Variable resistor R2 may have a range of from 0 to 200 kilohms. Variable resistor R2 provides manually adjustable means to compensate for manufacturing differences in the impedances of the components and arms AB and BE. Rectifiers D1 and D2 also are shunted by capacitors C2 and C3 respectively which increase the stability of the amplifier and tend to increase the gain by enabling greater reset of the magnetic cores as will be more fully described in the operational discussion of the device hereinafter described. An RC network consisting of parallel resistor R6 and capacitor C5 is connected in arm FA of the bridge and another RC network consisting of parallel resistor R4 and capacitor C4 is connected in arm EF.

Rectifiers D1 and D2 are shunted by resistors and capacitors so that the amount of negative load current flowing is controlled by the shunt rather than by the back resistance of the rectifier, thus minimizing the effect of the changes in rectifier back-resistance due to aging or temperature changes. These shunting resistors and capacitors determine the extent to which a negative induction of each core goes negative on the negative swing of the oscillator voltage.

The magnetic bridge amplifier is energized across points B and F by oscillator 10 which when no signal current is flowing in the control winding circuit drives the cores of the saturable reactors T1 and T2 through a complete cycle of magnetization, the two cores simultaneously going through the cycle and into saturation. The tuned choke, consisting of windings L1 and L2 and capacitor C1, presents a large impedance to the oscillator frequency and its harmonics so that uncancelled voltages induced in the control windings because of the transformer effect are limited, but the choke presents a low impedance to the frequencies of the input signals.

When a signal is present at input terminals 12 a small signal current flows through control windings L3 and L6. Since the control windings L3 and L6 are connected in phase opposition with respect to each other the magnetic field at one of the cores aids the magnetic field caused by the load winding current while the magnetic field of the other core opposes the magnetic field of the load winding current. At each cycle of applied oscillator voltage, the aiding core, because it requires a smaller increase in current to drive the core to saturation, saturates first and to a greater extent.

When saturable core T1, for example, is saturated, coils L3 and L4 offer a relatively small impedance causing a greater current flow through arm AB until core T2 is saturated. Cores T1 and T2 come out of saturation almost simultaneously at which time the bridge arm impedances are again equalized. Between saturation of cores T1 and T2 for a short period of time during each cycle of oscillator voltage applied to the bridge, there is an unbalanced voltage across points A–E. The magnitude of the current flow in the control winding determines the degree of saturation of the two coils which then determines the unbalanced current which flows through the load.

Capacitors C2 and C3 tend to increase the gain of the bridge amplifier by enabling greater reset of magnetic cores T1 and T2 during the initial reverse or reset half cycle of the driving oscillator 10.

Normally with no signal applied cores T1 and T2 saturate simultaneously. When T1 and T2 saturate, capacitors C4 and C5 charge to the same potential which would be relative to the oscillator voltage at the time of core saturation. With C4 and C5 charged to the same potential there is no difference in potential between points A and E and consequently no output current.

If when a signal is applied core T1 saturates first or earlier than the no signal time of saturation, capacitor C5 will charge to a higher potential relative to the oscillator voltage at time of saturation. Core T2 will saturate later due to the signal and consequently capacitor C4 will charge to a lower potential, determined by the oscillator voltage at the time of saturation. C5 is now charged to a higher potential than C4 with a resulting potential difference between points A and E. These two capacitors will tend to discharge to an equal potential until the cores saturate again on the next cycle. This potential difference is applied to the output circuit.

The inductance L7 in the load discharge paths of capacitors C5 and C4 effect the discharge rate and shape of the output current providing a high average value current output without increasing the peak charge on the capacitors. Variable resistor R5 in the load provides an adjustment for the amplifier current gain from a maximum to a desired value.

From the foregoing it is seen that a magnetic bridge amplifier is devised which has high circuit stability and provides high current gain from low amplitude low frequency input signals.

Obviously many modifications and variations of the present invention are possible in the light of the above teachings. It is therefore to be understood, that within the scope of the teachings herein and the appended claims the invention may be practiced otherwise than as specifically described.

What is claimed as new and desired to be protected by Letters Patent of the United States is:

1. A magnetic bridge amplifier for providing a high current gain output to a load from low current low frequency input signals comprising, a four-arm, four-junction bridge having a driving oscillator connected to two of said junctions and a load connected to the other two of said junctions, a pair of saturable reactor cores each having a control winding and a load winding, said control windings connected in series, input signal means connected in series with said control windings for receiving low current low frequency signals, a pair of unidirectional conducting devices each connected in series with a respective one of said load windings, a resistor and a capacitor connected in parallel shunting each of said unidirectional conducting devices, one of said load windings, unidirectional conducting devices, and parallel resistor-capacitor shunts defining a first arm of said bridge, and the other load winding, unidirectional conducting device, and parallel resistor-capacitor shunt defining a second arm of said bridge, a parallel resistor and capacitor defining a third arm of said bridge, and another parallel resistor and capacitor defining a fourth arm of said bridge.

2. The apparatus of claim 1 wherein said load includes an inductance element and a resistor connected in series.

3. The apparatus of claim 2 further comprising a variable resistor connected in series with said resistor element and said inductance element.

4. The apparatus of claim 1 wherein said input means includes a pair of input terminals, and a tuned choke having a first winding, a second winding, and a capacitor, said capacitor connected in parallel with said second winding, said first winding connected between one of said terminals and one of said saturable reactor control windings, and said second winding and capacitor connected between the other input terminal and the other saturable reactor control winding.

5. The apparatus of claim 4 wherein said load includes an inductance element and a resistor element connected in series.

6. A magnetic bridge amplifier for providing high current gain output to a load comprising, a four-arm, four-junction bridge having a driving oscillator connected to two of said junctions and a load connected to the other two of said junctions, a pair of saturable reactor cores each having a control winding and a load winding, said control windings connected in series, a pair of input terminals, a tuned choke having a first winding, a second winding, and a capacitor, said capacitor connected in parallel with said second winding, said first winding connected between one of said terminals and one of said saturable reactor control windings, and said second winding and capacitor connected between the other input terminal and the other saturable reactor control winding, a pair of unidirectional conducting devices each connected in series with one of said load windings, two resistors each shunting one of said unidirectional conducting devices, one of said load windings and one of said unidirectional conducting devices shunted by one of said resistors defining a first arm of said bridge, and the other load winding connected to the other unidirectional conducting device shunted by the other resistor defining a second arm of said bridge, a first resistor and a first capacitor connected in parallel defining a third arm of said bridge, and a second resistor and a second capacitor connected in parallel defining a fourth arm of said bridge.

7. A magnetic bridge amplifier providing high current amplification to an inductive resistive load from a low current low frequency input signal comprising, a four-arm, four-junction bridge having a driving oscillator connected to two of said junctions and an inductive resistive load connected to the other two of said junctions, a pair of saturable reactor cores each having a control winding and a load winding, said control windings connected in series, input signal means having a tuned choke connected in series with said control windings, a pair of semiconductor diodes each having an anode electrode and a cathode electrode, each cathode electrode directly connected to a respective one of said load windings, and each anode electrode connected to the same oscillator junction, a resistor and a capacitor connected in parallel shunting each of said diodes, a load winding, a diode and a parallel resistor-capacitor shunt defining first and second arms of said bridge respectively, said first arm connected between one oscillator junction and one load junction, and said second arm connected between said one oscillator junction and the other load junction, a first resistor-capacitor network parallelly connected between said one load junction and another oscillator junction and a second resistor-capacitor network connected in parallel between said other load junction and said other oscillator junction.

References Cited

UNITED STATES PATENTS

| | | | |
|---|---|---|---|
| 2,734,165 | 2/1956 | Lufcy et al. | 323—89 |
| 2,832,019 | 4/1958 | Cohen | 323—89 |
| 3,045,174 | 6/1962 | Lafuze | 330—8 X |

ROY LAKE, *Primary Examiner.*

NATHAN KAUFMAN, *Examiner.*